O. H. LEHMANN.
MULTIPLE ROW BALL BEARING.
APPLICATION FILED AUG. 25, 1919.

1,367,610.

Patented Feb. 8, 1921.

WITNESSES
Geo Schwarz

INVENTOR
Otto H. Lehmann
BY
Redding & Greeley
ATTORNEYS

UNITED STATES PATENT OFFICE.

OTTO H. LEHMANN, OF LANCASTER, PENNSYLVANIA, ASSIGNOR TO THE BEARINGS COMPANY OF AMERICA, OF LANCASTER, PENNSYLVANIA, A CORPORATION OF NEW JERSEY.

MULTIPLE-ROW BALL-BEARING.

1,367,610.     Specification of Letters Patent.     Patented Feb. 8, 1921.

Application filed August 25, 1919. Serial No. 319,802.

*To all whom it may concern:*

Be it known that I, OTTO H. LEHMANN, a citizen of Germany, residing in the city of Lancaster, in the State of Pennsylvania, have invented certain new and useful Improvements in Multiple-Row Ball-Bearings, of which the following is a specification, reference being had to the accompanying drawing, forming a part hereof.

The most serious difficulty in the manufacture of multiple row ball bearings has been encountered in the provision of suitable cages therefor which would retain the balls in proper rolling position without binding. The pole cage is recognized as the most suitable cage for any radial ball bearing but the practical impossibility of riveting the members of this cage in position after placing the balls in the race way, in the second bearing of a double row ball bearing has precluded the use of such a cage. A pole cage as known in the art is one in which each ball has diametrically opposed bearing points constituting poles about the axis of which the ball rolls. The object of this invention is to provide an annular double row ball bearing with two separate pole cages, the assembling of the balls and cages in the rings being accomplished without any particular difficulty.

In accordance with the invention outer and inner bearing rings are provided, one of which rings is divided circumferentially thereby permitting the balls and cage to be assembled, *in situ*, and the second set of balls and cage to be assembled on the second part of the divided ring and subsequently inserted in the bearing.

The invention will be described in detail in connection with two practicable embodiments thereof in which double rows of balls are employed, although it is to be emphasized at this time that wherever reference is made in the specification to a double row ball bearing, it is to be understood, by mechanical adaptations, the principle of the invention might be incorporated in multiple rows of balls. In the drawing—

Figure 1:
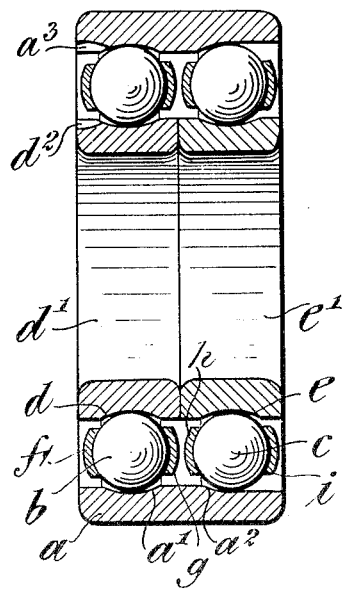
Figure 1 is a diametrical sectional view through a bearing formed with a solid outer ring and a divided inner ring.

As shown in Fig. 1, there is provided a solid outer bearing ring $a$ formed with a full radial grooved race way $a'$, to receive one set of balls $b$, and with a half radial grooved or open type race way $a^2$ for the other set of balls $c$. The coöperating race ways $d$, $e$ for the balls $b$, $c$, respectively, are formed as full radial grooves in separate inner rings $d'$, $e'$, respectively, one of these rings $d'$ being formed with a filling slot $d^2$ for inserting the balls $b$. In the outer ring $a$ and communicating with the race way $a'$ is a filling slot $a^3$ which, when brought into line with the filling slot $d^2$, permits the balls to be introduced in a manner which is now commonly practised. The balls $b$ are maintained in proper relation to one another and to their respective race ways for bearing both radial and axial loads by means of a pole cage consisting of opposed annular strips of metal $f$, $g$ stamped in proper form to embrace the balls while allowing movement thereof, and riveted together to form with the balls a unitary structure. The balls $c$, in like manner, are held in proper spaced relationship on the ring $e$ by means of the annular cage sections $h$, $i$ which are likewise riveted together at points between the balls.

This invention is concerned as much with the method of assembling the balls and cages in multiple row bearings as with the structural details by which this method can be successfully practised.

Figure 2:
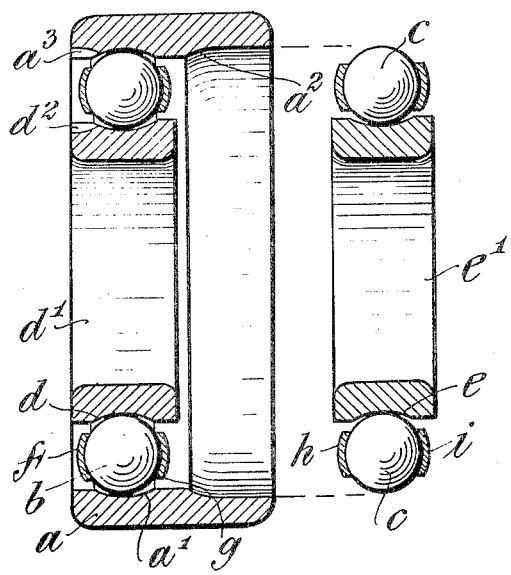
Fig. 2 is a view similar to Fig. 1, but showing one of the inner rings with the balls and cages assembled thereon, removed from the outer ring.
Figure 4:
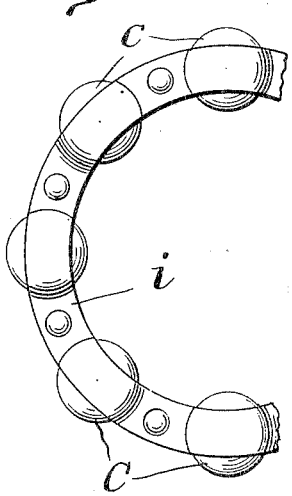
Fig. 4 is a fragmentary view in elevation of one of the cages showing the relative positions of the balls and the rings for holding together the two parts of the cage.

Referring now to Fig. 2, the method of assembling can readily be understood. The balls $b$ are first assembled in the race ways $a'$, $d$ of the outer ring $a$ and the inner ring $d'$ and the opposed cage sections $f$, $g$ are then placed in proper relation to the balls and riveted together. In assembling a bearing of this type it is to be understood that the filling of the race ways with the balls is completed by using the side filling slots $d^2$, $a^3$. The riveting of the opposed sides $f$, $g$ of the pole cage is readily accomplished since at this time the other ring $e'$ is entirely removed from the outer ring $a$. The balls $c$ in proper number are then assembled in proper relation on the race way $e$ of the second inner ring $c'$ and secured on the race way in proper spaced relation by means of the annular cage sections $h$, $i$ which are riveted together. It will be evident that the crux of the invention resides in the provision of a bearing in which the cage pieces for each row of balls may be riveted without hindrance, it being necessary that the relation of each cage to each set of balls is such that no binding ensues. Where there is binding it is evident that suitable relief may be made immediately upon determining it, the various steps in the making of the improved bearing being such that each step is independent of the other and any difficulties encountered can be overcome at the instant without requiring the undoing of any work previously completed. Accordingly, with the two inner rings $d'$, $e'$ and their balls and cages in the positions indicated in Fig. 2 the workman can test the bearings for free and proper operation before completing the assembling. To complete the assembling the inner ring $e'$ with its balls and cage is slipped into place in the half radial grooved or open race way $a^2$. The bearing as illustrated in Fig. 1 is then a complete unitary structure.

Figure 3:
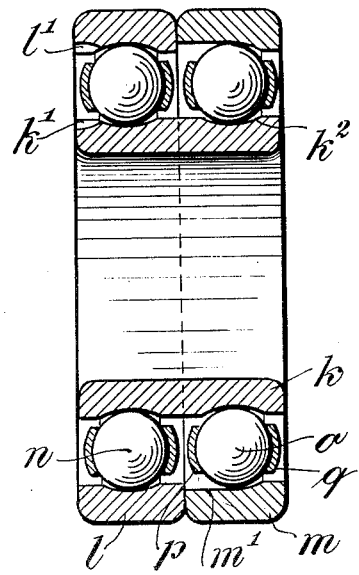
Fig. 3 is a diametrical sectional view of a modified construction in which there is provided a solid inner ring and a divided outer ring.

The same principle is employed in the embodiment illustrated in Fig. 3 but structurally, the difference resides in the provision of a solid inner ring $k$ with separate outer rings $l$, $m$, one of which, $l$, is provided with a side filling slot $l'$ for coöperating with a side filling slot $k'$ in the inner ring for the assembling of the balls $n$ in the manner heretofore described. The other balls $o$ are assembled on the full radial grooved race way $k^2$ on the inner ring $k$ and secured in position by riveting together the opposed cage members $p$, $q$. In the last step of assembling the outer ring $m$ with a half radial grooved or open race way $m'$ extending to its inner edge is slipped on to the balls $o$.

As pointed out hereinbefore, multiple rows of balls may be assembled with pole cages in the manner described herein by employing the same principle and it is this principle which constitutes the essence of the invention, the structural details described being possibly susceptible of modification when attempted by a skilled mechanic in an effort to retain the general principle but avoid the illustrated embodiments.

I claim as my invention:

1. A multiple row ball bearing comprising an inner bearing ring, an outer bearing ring, a plurality of sets of bearing balls, and a separate cage for each set of balls, one of said rings being divided circumferentially, the inner and outer rings being formed with full radial grooved race ways for one set of balls and side filling slots for inserting the balls, one of said rings being formed with a full radial grooved race way for the other set of balls and the other of the said rings being formed with a half radial grooved race way for the other set of balls.

2. A multiple row ball bearing comprising a solid outer bearing ring, two inner bearing rings, a plurality of sets of bearing balls, the inner rings being formed with full radial grooved race ways and the outer ring being formed with one full radial grooved race way and with one half radial grooved race way, the coöperating full radial grooved race ways of the inner and outer rings, respectively, being formed with side filling slots, and a separate cage for each set of balls.

3. The method of assembling a multiple row ball bearing having two sets of balls adapted to run in closed race ways and open race ways, respectively, which consists in inserting the balls in the closed race way through the side filling slots, securing them in spaced relationship by riveting together the opposite sides of a pole cage, assembling the balls on the full radial grooved race way of an inner ring of the bearing and securing them in spaced relationship on said race way by riveting together the opposed sides of a full cage, and then inserting the last named ring with the balls and cage in position in the open type race way in the outer ring.

This specification signed this 21st day of August A. D. 1919.

OTTO H. LEHMANN.